United States Patent Office 3,132,534
Patented May 12, 1964

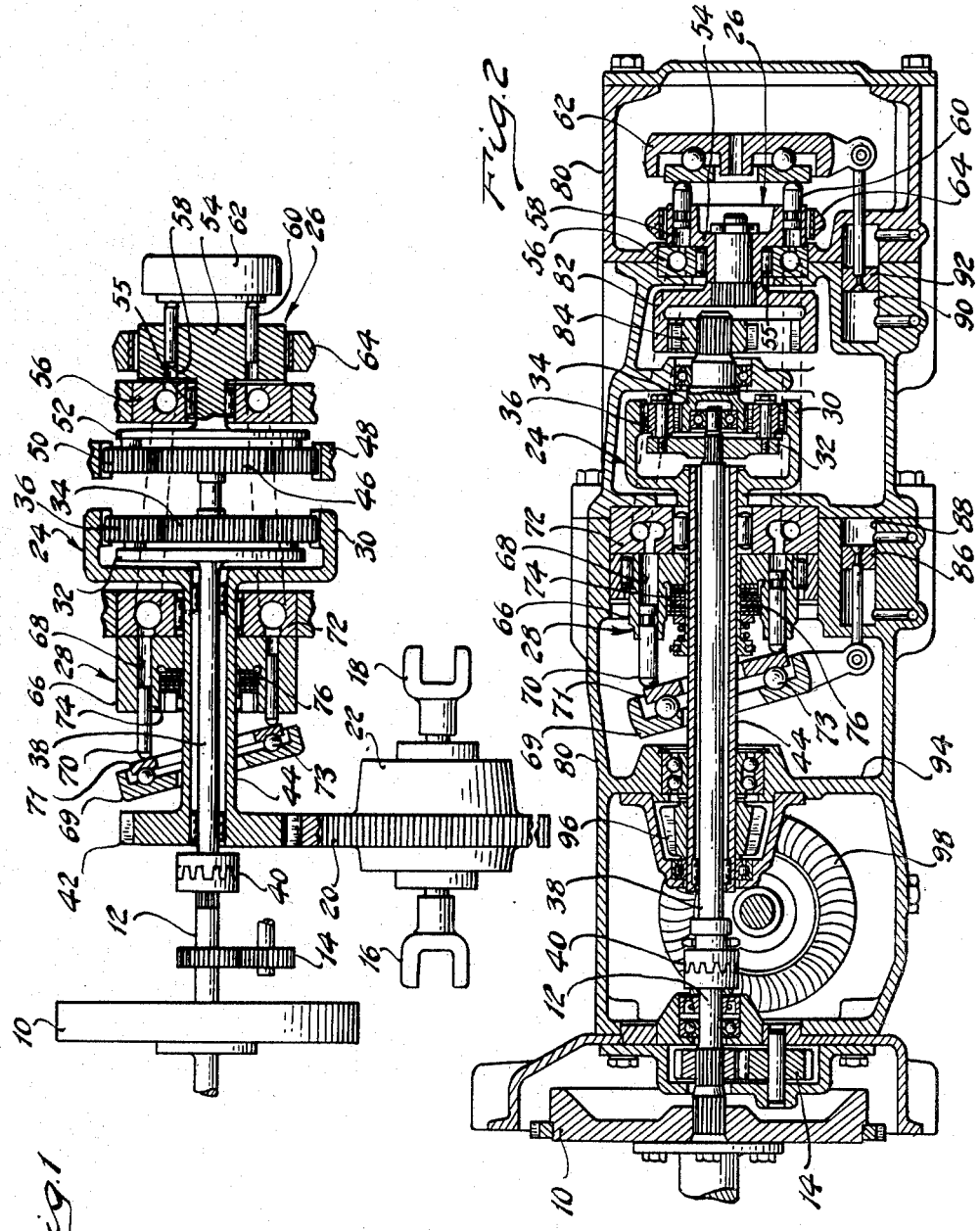

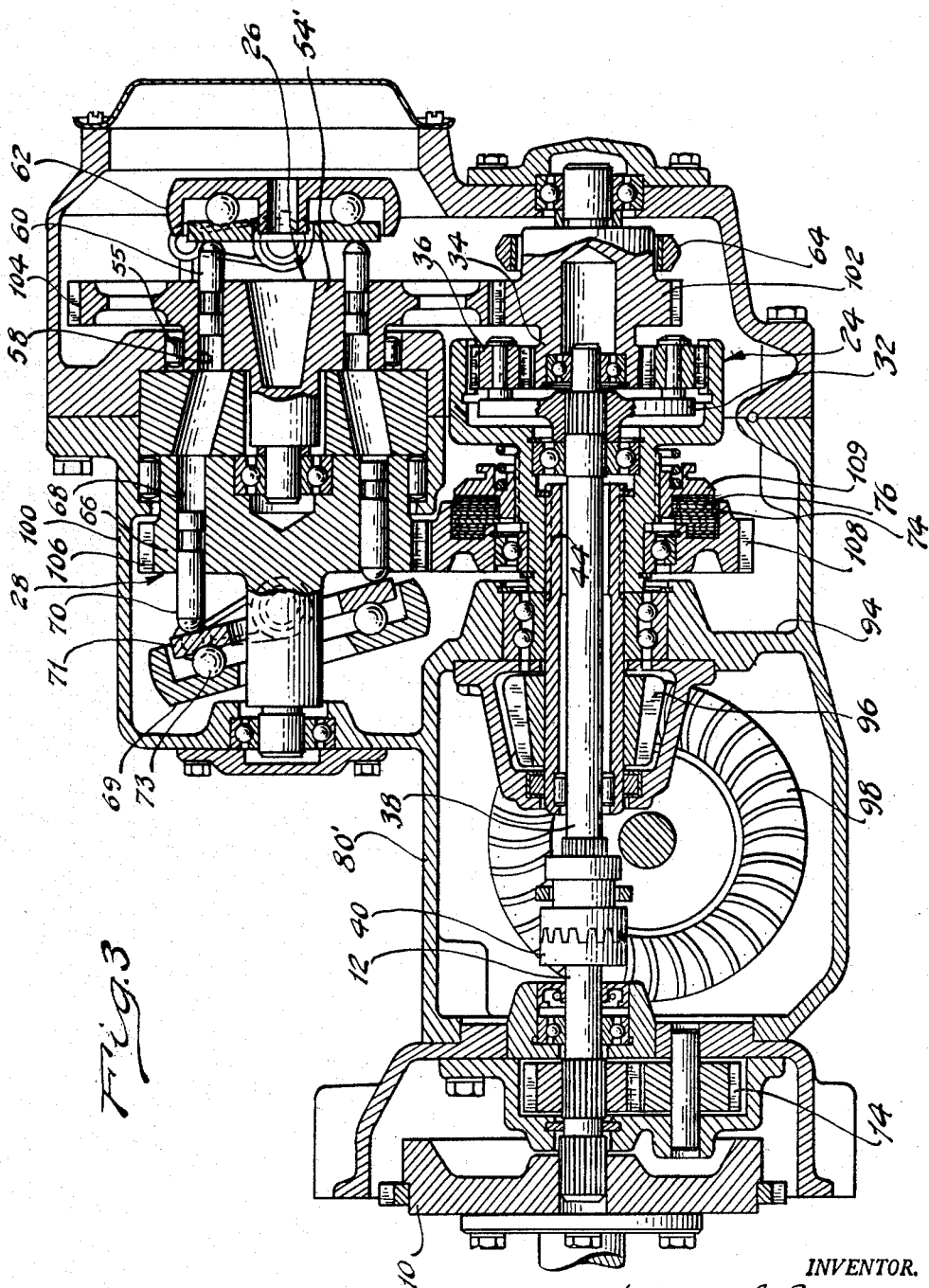

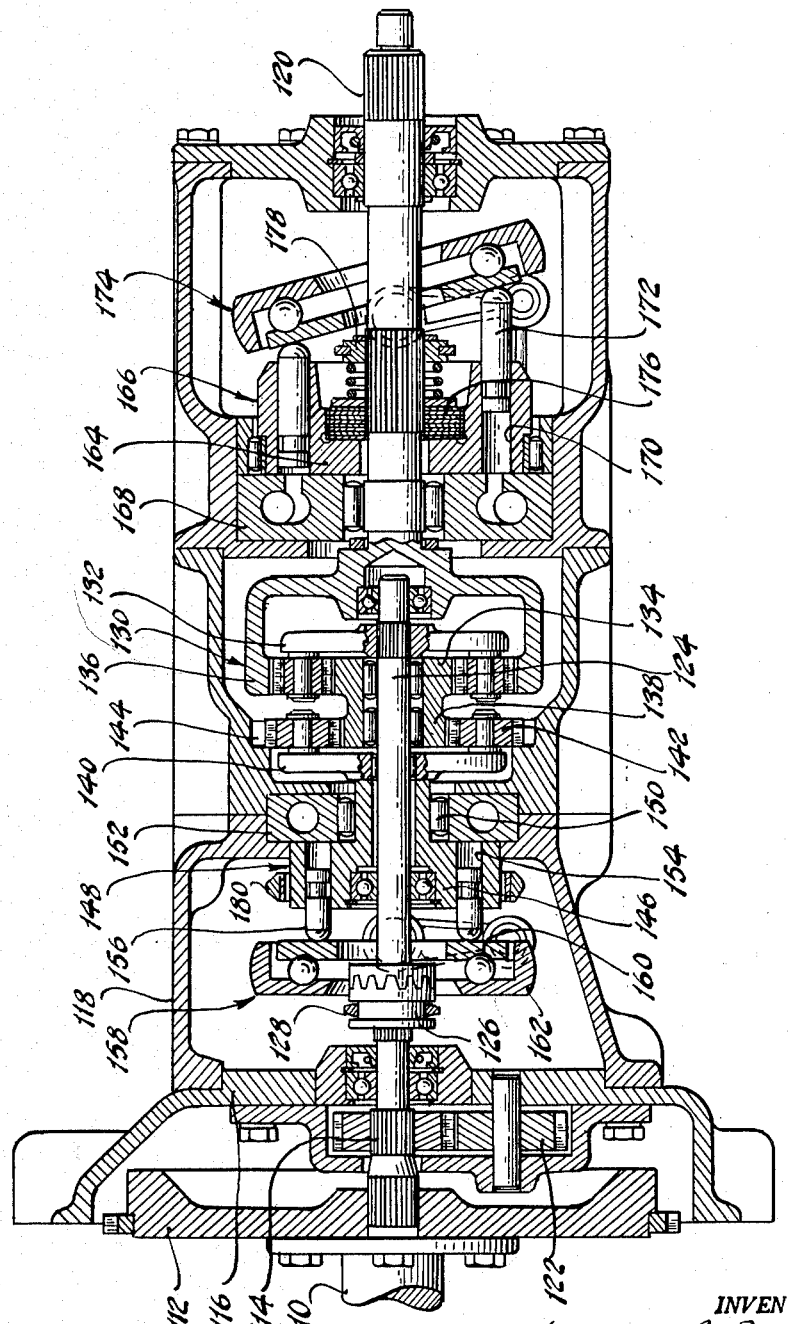

3,132,534
HYDROSTATIC-MECHANICAL POWER
TRANSMISSION MECHANISM
Ludwig G. Boehner, Braunschweig, Germany, assignor to Ford Motor Company, Dearborn, Mich., a corporation of Delaware
Filed Jan. 16, 1961, Ser. No. 82,761
6 Claims. (Cl. 74—687)

My invention relates generally to power transmission mechanisms, and more particularly to a power transmission mechanism employing torque delivery gear elements and hydrostatic pump and motor units. According to a principal feature of my invention, the gear elements and the hydrostatic units cooperate to define a split torque delivery path during operation at lower operating speeds whereby only a portion of the total power transferred to the driven member is distributed through the hydrostatic units while the remainder of the power is distributed through the gear elements.

The gear elements include a planetary gear unit, and one member of the planetary gear unit is drivably connected to a source of power, such as an internal combustion engine. The driven member is drivably connected to a second member of the planetary gear unit and the third member thereof acts as a reaction member. The hydrostatic pump unit is mechanically connected to the reaction member of the planetary gear unit and the hydrostatic motor unit is drivably connected to the driven member. The hydrostatic pump and motor units are of the variable displacement type, and they are disposed in a closed hydraulic circuit. The degree of reaction provided by the third member of the planetary gear unit can be varied by appropriately adjusting the relative displacements of the hydraulic units, and this in turn results in an infinitely variable over-all speed ratio.

The provision of a power transmission mechanism of the type above set forth being an object of my invention, it is a further object of my invention to provide a hydromechanical mechanism of the type above set forth wherein the over-all speed ratio can be varied from a maximum to a minimum by appropriately varying the relative displacement of the hydrostatic units, and wherein provision is made for rendering the hydrostatic units inoperative at higher speeds so that the torque delivery path is entirely mechanical.

It is a further object of my invention to provide a split torque drive of the type above set forth wherein a portion of the power distributed through the hydrostatic torque delivery path is regeneratively distributed to the power input portion of the mechanism.

It is a further object of my invention to provide a combined mechanical and hydrostatic drive in which the over-all mechanical efficiency is maintained at a desirably high value during normal steady state operation following a period of acceleration.

Further objects and features of my invention will readily become apparent from the following particular description and from the accompanying drawings wherein:

FIGURE 1 shows in schematic form a cross-sectional assembly view of one embodiment of my invention, and, FIGURES 2, 3 and 4 are cross-sectional assembly views of alternate embodiments of my invention.

Referring first to FIGURE 1, an internal combustion engine is designated by reference character 10, and it powers a power input shaft 12 for the transmission mechanism. Suitable accessory gears 14 can be provided if desired.

Power output couplings are shown at 16 and 18, and these couplings can be suitably connected to traction wheels for a wheeled vehicle. A power output ring gear 20 is carried by a differential mechanism 22, the latter being adapted to distribute torque to the couplings 16 and 18 in the usual fashion.

A planetary gear unit is generally shown at 24 and a positive displacement hydrostatic pump unit is generally shown at 26. This unit 26 is situated in a closed hydraulic circuit that also includes a hydrostatic motor unit as shown at 28.

The planetary gear unit 24 includes a ring gear 30, a carrier 32, a sun gear 34 and planet gears 36, the latter being rotatably journaled on carrier 32 in meshing engagement with ring gear 30 and sun gear 34. Carrier 32 is connected to a shaft 38 which in turn is coupled to shaft 12 by means of a suitable clutch 40. The clutch 40 can be adapted to be engaged and disengaged by the vehicle operator, and it can therefore function as a neutral clutch.

Ring gear 20 drivably engages a power output gear 42 which in turn is connected to ring gear 30 by means of a sleeve shaft 44, the shaft 38 extending through shaft 44 as indicated.

Sun gear 34 is connected to a sun gear 46 for a secondary planetary gear unit. The ring gear for the secondary planetary gear unit is shown at 48, and planetary pinions 50 are situated in driving engagement with gears 46 and 48. The carrier member 52 rotatably journals the planetary pinions 50, and it in turn is connected to a rotor 54 for the hydrostatic pump unit 26. The rotor 54 is journaled by bearing means, such as rollers 55, within a stationary pump housing 56, and it is provided with a series of pumping cylinders 58 within which piston elements 60 are reciprocally mounted. A swash plate 62 engages the piston elements 60 and when the rotor 54 revolves about the axis of the mechanism, the piston elements 60 will reciprocate in their respective cylinders. The magnitude of the stroke for the piston elements 60 depends upon the degree of inclination of the swash plate 62.

The rotor 54 for the pump unit 26 can be anchored by means of a brake band 64 which encircles the same. The band 64 in turn can be actuated in a conventional fashion, such as by means of a mechanical brake actuating linkage or a brake operating servo.

The motor unit 28 comprises a rotor 66 which surrounds sleeve shaft 44. The rotor 66 is formed with cylinders 68 within which reciprocating piston elements 70 are situated.

A motor housing 72 also surrounds sleeve shaft 44, and it is situated in adjacent relationship with respect to the rotor 66. The housing 72 is formed with inlet and outlet ports that respectively communicate with the outlet and inlet ports for housing 56 of the pump unit 26.

The rotor 66 is recessed as shown at 74 for the purpose of accommodating clutch discs 76. Alternate ones of the discs 76 are carried by rotor 66 and the other cooperating discs are carried by sleeve shaft 44. Means may be provided for pressurizing the discs 76 to establish a driving connection between rotor 66 and shaft 44.

Piston elements 70 engage a swash plate 69 which can be angularly adjusted about an axis transverse to the axis of shaft 38. Swash plate 69 comprises a bearing plate 71 which contacts piston elements 70, and suitable bearing elements 73 are situated between the plate 71 and the surrounding portion of the swash plate 69. The displacement of motor unit 28 can be varied as desired by suitably adjusting the angularity of the swash plate 69 in a conventional fashion.

To establish a maximum speed reduction the brake 64 is disengaged and the clutch 76 is applied. Further, the swash plate 62 is moved to a position of minimum displacement while the motor unit 28 is adjusted to a maximum displacement position.

Engine 10 will distribute driving torque through clutch 40 to carrier 32. The reaction torque of sun gear 34 is distributed to sun gear 46, and since ring gear 48 is anchored reaction torque is distributed to carrier 52 and to the rotor 54 of the pump unit 26. Pump unit 26 will therefore drive motor unit 28 in a forward driving direction to supplement the torque being distributed from engine 10 to ring gear 30 through carrier 28 and through shaft 38. The combined torque distributed hydraulically and mechanically to ring gear 30 is transferred through shaft 44 to power output gear 42 which in turn drives ring gear 20. The power output couplings 16 and 18 are driven in this fashion.

To provide an increased over-all speed ratio, the displacement of the pump unit 26 can be progressively increased and the displacement of the motor unit 28 can be progressively decreased. This increases the degree of reaction of sun gear 46 and sun gear 34. This increased reaction will, of course, cause the speed of ring gear 30 to increase and the percentage of the power distributed to ring gear 30 through the mechanical torque delivery path therefore increases with respect to the percentage of the power delivered through the hydrostatic torque delivery path.

The displacements of the pump and motor units can be varied in this fashion until sun gear 34 assumes a stationary condition. At this time the entire engine torque is distributed mechanically to ring gear 20 and to the power output couplings 16 and 18. When this occurs, the hydrostatic units can be rendered inoperative by applying brake 64, thereby simultaneously anchoring rotor 54, sun gear 46 and sun gear 34. Clutch 76 can be disengaged and rear gear 30 and sleeve shaft 44 are then independent of rotor 66. The mechanism will thereafter function as a mechanical, geared torque delivery mechanism and the overall operating efficiency will not depend upon the efficiencies of the pump and motor units. Further, fluid circulation through the closed hydraulic circuit under zero torque conditions is eliminated.

To establish reverse drive operation the swash plate 69 for the motor unit 28 can be adjusted in a direction opposite from that shown in the drawing. Under these circumstances the pump unit 26 will drive the motor unit 28 in a rearward direction in opposition to the forward driving torque delivered to ring gear 30 by the carrier member 32 and the shaft 38.

It is apparent from the foregoing that the hydrostatic pump and motor units operate at relatively high speeds. Also, only a portion of the effective driving torque is distributed through the hydrostatic torque delivery path under any given operating condition. These factors both contribute to lower hydrostatic pressures and it is thus possible to utilize small, inexpensive hydrostatic pump and motor units.

The mechanism is also capable of providing engine braking during deceleration of the vehicle. Once a steady state road load condition has been established and the sun gear 46 is anchored, the planetary gear unit will be effective to transfer braking torque therethrough since the sun gear 34 is anchored and a driving relationship is established between carrier 32 and ring gear 30. If additional engine braking is desired under these conditions, clutch 76 can be energized thereby causing rotor 66 to turn in unison with sleeve shaft 44. This establishes a fluid circulation in the hydraulic circuit and the hydrostatic unit 28 acts as a pump.

In FIGURES 2, 3 and 4 I have illustrated alternate working embodiments of my invention. These embodiments are related to the mechanism described with reference to FIGURE 1. In FIGURES 2 and 3, the components have been identified by the same reference characters used in FIGURE 1 for identifying corresponding components. In addition to the structure that is common to that shown in FIGURE 1, FIGURE 2 shows at 80 a transmission housing that encloses the hydrostatic units and the planetary gear units. Further, an internal gear 82 and a cooperating external gear 84 are used in lieu of the sun gear 46, the carrier 52, planet pinions 50 and ring gear 48 shown in FIGURE 1. Gears 82 and and 84 establish a driving connection between sun gear 34 of the planetary gear unit 24 and the rotor 54 of the hydrostatic unit 26.

The adjusting mechanism for the swash plate 69 of the hydrostatic unit 28 includes a piston 86 pivotally connected to swash plate 69. Piston 86 is reciprocally mounted in a cylinder 88 formed in housing 80. Fluid pressure may be distributed to either side of the piston 86 through suitable porting.

In a similar fashion, housing 80 defines a cylinder 90 within that is slidably positioned a piston 92 which in turn is connected to swash plate 62 for the hydrostatic unit 26. The angularity of the swash plate 62 can be adjusted by suitably pressurizing either one side of the piston 92 or the other. The details in the construction of the swash plate 62 have been illustrated more fully in FIGURE 2 than the corresponding structure in FIGURE 1. It will be apparent that the construction of swash plate 62 is similar to the construction of swash plate 69, previously described.

Housing 80 further includes a wall 94 that provides a bearing support for a power output gear in the form of a bevel pinion 96. This pinion 96 is used in lieu of gear 42 in the embodiment of FIGURE 1. Pinion 96 engages bevel ring gear 98 which in turn is mounted for rotation about an axis transversely disposed with respect to the axis of shafts 38 and 44.

The arrangement of FIGURE 2 can be appropriately termed a trans-axle, and it is particularly adapted for front wheel drive vehicles in which the axis of the traction wheels is relatively close to the crankshaft of the engine.

Referring next to FIGURE 3, I have illustrated an alternate trans-axle arrangement of relatively reduced axial dimensions. This reduction in axial length is accomplished by relocating the hydrostatic pump and motor units for rotation about an axis that is parallel to the axis of the planetary gear unit. For purposes of clarity, corresponding reference characters have been used to identify components in FIGURE 3 that are common to the construction of FIGURE 2.

The housing for the embodiment of FIGURE 3 is identified by reference character 80′ and it includes a portion 100 that is offset with respect to the portion that encloses the planetary gear unit 24. The sun gear 34 of the planetary gear unit is connected to a gear 102 which is in driving engagement with a gear 104 and a housing portion 100. Brake band 64 in the embodiment of FIGURE 3 is adapted to selectively anchor gear 102 and the sun gear 46 when it is applied. Brake band 64 is also effective to anchor gear 104, the latter in turn being carried by rotor 54′ for the hydrostatic pumping unit.

In the embodiment of FIGURE 3 the rotor 66 is not adapted to be clutched directly to shaft 44. Instead, rotor 66 carries a gear 106 which is adapted to engage a power output gear 108, the latter being journaled for rotation about the axis of shaft 44. Clutch 76 in the embodiment of FIGURE 3 is used for the purpose of clutching gear 108 to shaft 44, and it includes a clutch actuator ring 109 which may be urged in either a right-hand direction or a left-hand direction, as viewed in FIGURE 3, to effect disengagement and engagement of clutch 76 respectively. For this purpose member 109 is formed with an annular groove in which a shifter fork may be positioned.

In the embodiment of FIGURE 4 I have illustrated an in-line arrangement having features that are common to the embodiments of FIGURES 1, 2 and 3. For the purpose of clarity, however, new reference characters will be used in describing the components of the embodiment of FIGURE 4.

The engine crankshaft is illustrated at 110 and the driven shaft is shown at 120. A flywheel 112 is connected to crankshaft 110 and a power input shaft 114 is positively splined to the flywheel as indicated. Shaft 114 is journaled in a forward wall 116 of a transmission casing 118. Shaft 114 has secured thereto accessory gears 122 which correspond to the previously described gears 14.

A torque delivery shaft 124 is adapted to be clutched to shaft 114 by means of a positive clutch mechanism 126. This mechanism includes engageable clutch parts that can be moved to an engaged or disengaged position by means of a shifter fork shown in part at 128.

A first planetary gear unit 130 comprises a carrier member 132, a sun gear member 134 and a ring gear member 136, the carrier member 132 being connected to shaft 124. Sun gear member 134 is connected to another sun gear member 138. A second carrier member, shown at 140, rotatably journals planet pinions 142 which engage sun gear member 138 and a stationary ring gear 144, the latter being connected to housing 118 as indicated.

Carrier member 140 is connected to a rotor 146 for a hydrostatic pump unit 148, said rotor 146 being journaled by bearings 150 to a pump housing 152 that in turn is fixed to housing 118. Rotor 146 has formed therein a plurality of cylinders 154 within which are positioned a plurality of piston elements 156, said piston elements 156 engaging a swash plate assembly 158.

Assembly 158 includes a bearing plate 160 and a portion 162 that is journaled for oscillation about an axis that is disposed transversely with respect to the axis of shaft 124. Bearing elements are situated between portion 162 and plate 160 as indicated. The effective displacement of the pumping unit 148 can be varied as desired by suitably positioning the angularity of the swash plate assembly 158. The shaft 124 extends through a rotor 146 and through gears 138 and 134, and suitable bearing means are provided at strategic locations along the shaft 124 to provide support as indicated.

Ring gear 136 is connected to power output shaft 120, the latter extending through a rotor 164 for the hydrostatic motor unit 166. Unit 166 further includes a motor housing 168 and rotor 164 includes a plurality of cylinders 170 within which piston elements 172 are mounted. Piston elements 172 engage a swash plate assembly 174 that is similar in construction to the previously described swash plate assembly 158. The angularity of the swash plate assembly 174 can be adjusted to alter suitably the effective displacement of the motor unit 166.

The housing portion 168 for the motor unit 166 and the housing portion 152 for the pumping unit 148 are suitably ported so that the pump and motor units are situated in a closed hydraulic circuit, the intake for one unit communicating with the output for the other unit and vice versa. The internal passage structure necessary to accomplish such an interconnection has not been illustrated in FIGURE 4.

Rotor 164 can be clutched to shaft 120 by a selectively engageable friction clutch mechanism 176. Clutch 176 comprises friction discs which are alternately connected to rotor 164 and to shaft 120. The discs can be urged into frictional engagement by pressurizing the same, a suitable clutch actuator 178 being provided for this purpose. The actuator 178 can be adjusted by an operator controlled shifter fork in a conventional fashion.

The operation of the structures of FIGURES 2, 3 and 4 is similar to the operation of the mechanism of FIGURE 1, previously described. To condition the mechanism for acceleration, the displacement of the pumping unit associated with the reaction sun gear of the planetary unit can be gradually increased. This tends to increase the driven speed of the motor unit which in turn transfers power regeneratively to the ring gear of the planetary gear unit, although a portion of this power delivered through the hydrostatic system is transferred to the power output shaft 120. When the motor unit is decreased in displacement, the gun gear of the planetary gear unit tends to revolve in a reverse direction. This is prevented, however, by a friction brake mechanism. In the embodiment of FIGURE 4, this friction brake mechanism is shown at 180, and it acts directly on the rotor for the pumping unit 148. When this condition has been established, the planetary gear unit is the sole power delivery path that is effective to transfer torque from the engine crankshaft 110 to the driven shaft 120. The mechanical inefficiency normally associated with hydrostatic units therefore has no influence on the over-all operating efficiency of the mechanism.

Having thus described certain preferred embodiments of my invention, what I claim and desire to secure by United States Letters Patent is:

1. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said gun gear member and said ring gear member, a first hydrostatic unit and a second hydrostatic unit situated in a closed hydraulic circuit, a first driving connection between one member of said gear unit and said first hydrostatic unit, a power output gear rotatably mounted about the axis of said drive shaft, a second driving connection between a second member of said gear unit and said driven shaft said power output gear being drivably connected to said second hydrostatic unit, clutch means for selectively clutching said power output gear to said driven shaft, one member of said gear unit being connected to said driving shaft, and means for adjusting the relative displacement of said hydrostatic units whereby the effective speed ratio of said planetary gear unit can be varied as desired.

2. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said sun gear member and said ring gear member, a first hydrostatic unit and a second hydrostatic unit situated in a closed hydraulic circuit, a first driving connection between one member of said gear unit and said first hydrostatic unit, a power output gear rotatably mounted about the axis of said driven shaft, a second driving connection between a second member of said gear unit and said driven shaft, said power output gear being drivably connected to said second hydrostatic unit, and clutch means for selectively clutching said power output gear to said driven shaft, one member of said gear unit being connected to said driving shaft, means for adjusting the relative displacement of said hydrostatic units whereby the effective speed ratio of said planetary gear unit can be varied as desired, and brake means for selectively anchoring said first hydrostatic unit to render the same inoperative.

3. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said sun gear member and said ring gear member, one member of said gear unit being connected to said driving shaft, a first hydrostatic unit and a second hydrostatic unit situated in a closed hydraulic circuit, a first driving connection between a member of said gear unit and said first hydrostatic unit, a second driving connection between a second member of said gear unit and said driven shaft, said hydrostatic units having axes of rotation offset with respect to the axes of rotation of said driving and driven shafts, means connecting said second hydrostatic unit and said driven shaft including a power output gear rotatably mounted about the axis of said driven shaft, said latter means also including selectively operable clutch means for selectively clutching said power output gear to said driven shaft, and means for adjusting the relative displacement of said hydrostatic units whereby the effective speed ratio of said planetary gear unit can be varied as desired.

4. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said sun gear member and said ring gear member, one member of said gear unit being connected to said driving shaft, a first hydrostatic unit and a second hydrostatic unit situated in a closed hydraulic circuit, a first driving connection between a member of said gear unit and said first hydrostatic unit, a second driving connection between a second member of said gear unit and said driven shaft, said hydrostatic units having axes of rotation offset with respect to the axes of rotation of said driving and driven shafts, means connecting said second hydrostatic unit and said driven shaft including a power output gear rotatably mounted about the axis of said driven shaft, said latter means also including selectively operable clutch means for selectively clutching said power output gear to said driven shaft, means for adjusting the relative displacement of said hydrostatic units whereby the effective speed ratio of said planetary gear unit can be varied as desired, and brake means for selectively anchoring said first hydrostatic unit to render the same inoperative.

5. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said sun gear member and said ring gear member, a first driving connection between a first member of said gear unit and said driving shaft, a first hydrostatic unit and a second hydrostatic unit situated in a closed hydraulic circuit, a second gear unit drivingly connecting a member of said planetary gear unit to said first hydrostatic unit, a second driving connection between a second member of said gear unit and said driven shaft, said hydrostatic units having axes of rotation offset with respect to the axes of rotation of said driving and driven shafts, means connecting said second hydrostatic unit and said driven shaft including a power output gear rotatably mounted about the axis of said driven shaft, said latter means also including selectively operable clutch means for selectively clutching said power output gear to said driven shaft, means for adjusting the relative displacement of said hydrostatic units whereby the effective speed ratio of said planetary gear unit can be varied as desired, and brake means for selectively anchoring said first hydrostatic unit to render the same inoperative.

6. In a power transmission mechanism for delivering power from a driving shaft to a driven shaft, said driving shaft being concentrically disposed within said driven shaft, a planetary gear unit comprising a sun gear member, a ring gear member, a carrier member, and planetary gears rotatably mounted on said carrier member in meshing engagement with said sun gear member and said ring gear member, said carrier member being connected to said driving shaft, a first hydrostatic unit and a second hydrostatic unit situated in a closed hydraulic circuit, a gear train connecting said sun gear member and said first hydrostatic unit, a second driving connection between said ring gear member and said driven shaft, said hydrostatic units having axes of rotation offset with respect to the axes of rotation of said driving and driven shafts, connecting means for connecting said second hydrostatic unit and said driven shaft including a first power output gear rotatably mounted about the axis of said driven shaft and other gear means meshing with said output gear and being connected to said second hydrostatic unit, said connecting means also including selectively operable clutch means for selectively clutching said power output gear to said driven shaft, and means for adjusting the relative displacement of said hydrostatic units whereby the effective speed ratio of said planetary gear unit can be varied as desired.

References Cited in the file of this patent

UNITED STATES PATENTS

| | | |
|---|---|---|
| 1,951,345 | Centervall | Mar. 20, 1934 |
| 2,097,021 | Normanville | Oct. 26, 1937 |
| 2,173,856 | Orshansky | Sept. 26, 1939 |
| 2,214,986 | Barnes | Sept. 17, 1940 |
| 2,294,994 | Maze | Sept. 8, 1942 |
| 2,296,929 | Ifield | Sept. 29, 1942 |
| 2,517,879 | Howard | Aug. 8, 1950 |
| 2,583,656 | Lay | Jan. 29, 1952 |
| 2,817,250 | Forster | Dec. 24, 1957 |
| 2,856,794 | Simpson | Oct. 21, 1958 |

FOREIGN PATENTS

| | | |
|---|---|---|
| 1,065,734 | Germany | Sept. 17, 1959 |
| 1,216,287 | France | Nov. 30, 1959 |